United States Patent [19]

Taylor et al.

[11] Patent Number: 4,547,701

[45] Date of Patent: Oct. 15, 1985

[54] IR LIGHT FOR USE WITH NIGHT VISION GOGGLES

[75] Inventors: Robert R. Taylor, Fort Worth; Billy C. Bowen, Euless; John H. Emery, Fort Worth, all of Tex.

[73] Assignee: Bell Helicopter Textron Inc., Fort Worth, Tex.

[21] Appl. No.: 510,208

[22] Filed: Jul. 1, 1983

[51] Int. Cl.⁴ .............................................. H01J 1/62
[52] U.S. Cl. .................................... 313/500; 313/499; 313/505; 313/506; 357/32
[58] Field of Search ............... 313/499, 500, 506, 505; 357/32

[56] References Cited

U.S. PATENT DOCUMENTS 3,675,064  7/1972  Coleman et al. ..................... 313/499

FOREIGN PATENT DOCUMENTS 2301502  12/1984  Fed. Rep. of Germany ...... 313/500
1397027   3/1965  France ................................. 313/499

OTHER PUBLICATIONS

Anvis Aviator's Night-Vision Imaging System, Bell and Howell Optics Division Brochure, (7 pages).
TRW Optron Products Bulletin No. 3010, Mar. 1982.

*Primary Examiner*—Arthur Kellogg
*Attorney, Agent, or Firm*—Richards, Harris, Medlock & Andrews

[57] ABSTRACT

An IR source of illumination for use with night vision goggles in which there is provided an array of a minimum of about eight Ga-Al-As diodes per group with two groups per array in a planar distribution with the spacing of the diodes within each group such that at least about 75% of the diodes are coupled to at least two neighboring diodes to provide coupling in the light pattern and to enhance the output thereof and means are provided to operate the diodes in parallel at about the current limit of the diodes whereby beams are generated which converge to provide a beam diameter of approximately 10° with a halo at approximately 30° at ranges beyond 15 meters.

3 Claims, 3 Drawing Figures

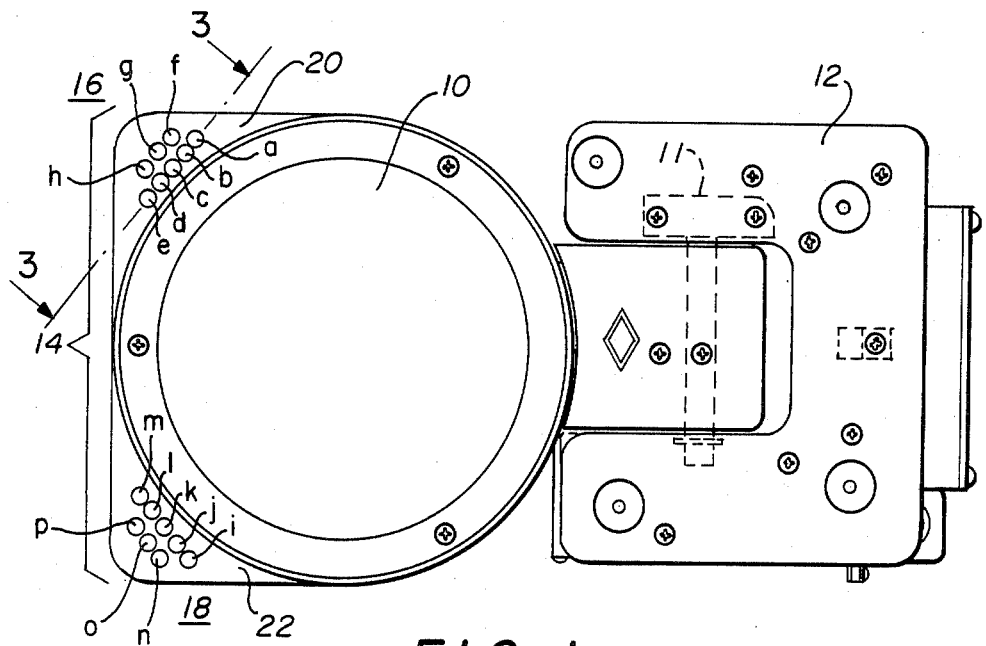
FIG. 1
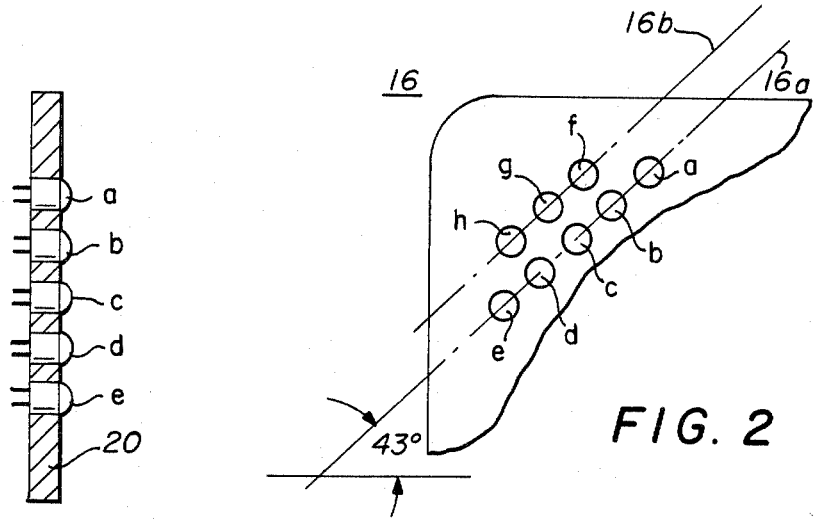
FIG. 3
FIG. 2

IR LIGHT FOR USE WITH NIGHT VISION GOGGLES

TECHNICAL FIELD

This invention relates to an array of solid state infrared (IR) emitting light sources to provide illumination compatable with night vision goggles wherein covert light, usable with such night vision goggles, may range on the order of nine hundred feet in standard atmosphere.

BACKGROUND ART

Heretofore, aviator's night vision imaging goggles have been designed to operate at light levels down to overcast starlight conditions. However, conditions can exist where the minimum light required is not available. Presently in use are filtered incandescent lamps to provide IR illumination to compensate for the absence of natural light when operating under extremely low light conditions.

While IR filtered incandescent lamps provide more than adequate IR illumination they have three major drawbacks:

1. The filter traps significant amounts of heat which reduces the filament life of the lamp to a fraction of its normal life. Indications are that the lamps used in standard landing systems used in some aircraft have a life of only eight to ten hours when operating with a pink IR filter whereas the normal specification of life for such a lamp without the filter is in excess of fifty hours.

2. Present filtering methods leave undesirable signatures in the emitted spectrum above 1 micron wave length. This signature is susceptible to enemy missile homing capabilities and as such produces a missile trap subject to missile homing of early generation sholder-fired heat seeking missiles. Efforts to filter out the objectable signature traps still more heat, further reducing the life of the lamp.

3. The high level of trapped heat associated with the IR filtered incandescent lamp provides a forward looking infrared signature for a significant period of time after the lamp is extinguished. Such a hot spot increases the possibility of enemy acquisition of the craft employing such a lamp after the covert lamp has been deenergized.

There is great need for a covert light source to provide IR illumination in the range of 300 meters or less from a helicopter, for example, particularly when operating in a nap of the earth environment.

The present invention is to provide a covert near IR source capable of providing illumination up to 300 meters or so while significantly reducing or eliminating the three problems above enumerated.

It is desirable to extend the reliability of the source to at least 500 hours of operation while eliminating the missile trap signature above 1 micron wave length and to reduce or eliminate the residual infrared signature remaining after the illuminator is extinquished.

DISCLOSURE OF THE INVENTION

In accordance with the present invention, solid state gallium-aluminium-arsenide (Ga Al As) infrared emitting diodes are employed in a forward looking array which simulates, with high intensity, the pattern of a single diode. In a more specific aspect, an array of IR gallium-aluminium-arsenide diodes is mounted, such as to the structure on the helicopter landing light, in a forward looking direction for selective use when goggles become unusable due to low ambient light conditions.

More particularly, an IR source of illumination is provided for use with night vision goggles. Included is an array of a minimum of about eight Ga-Al-As diodes mounted in planar distribution with the spacing of the diodes within said group such that each of a minimum of about 75% of the diodes are coupled in the light pattern to at least two other diodes in the array to enhance the output thereof with means to operate the diodes in parallel at about the current limit of the diodes.

BRIEF DESCRIPTION OF THE DRAWINGS

FIG. 1 is a front view of a helicopter landing light in which the present invention is incorporated.

FIG. 2 is a more detailed and enlarged view of the diode array of FIG. 1.

FIG. 3 is a sectional view taken along lines 3—3 of FIG. 1.

DETAILED DESCRIPTION

Referrring now to FIG. 1, a helicopter landing light 10 is mounted by means of a pin 11 to a bracket 12 secured to a helicopter air frame (not shown). Light 10 is a normal landing light, such as Bell Helicopter OH-58 landing light, generally used on such aircraft, and will be used herein as the setting for the following description of a preferred embodiment of the invention.

The most immediate application for the present invention is to provide a covert IR light which will enable a helicopter pilot using night vision goggles to see objects up to 300 meters or so, as is particularly desirable when flying in a nap of the earth environment.

In accordance with the invention, solid state gallium-aluminium-arsenide (Ga Al As) infrared emitting diodes are employed provide inhanced intensity and range when properly grouped and coupled.

As shown in FIG. 1 the diode array 14 is comprised of two groups 16 and 18. Each group comprises individual diodes which may be circuit board mounted and then bonded to a heat sink. Alternatively they may be bonded to the heat sink and hard wired to a power source and mounted to the bezel of a coventional landing light.

As shown in FIG. 1, the group 16, diodes a-h, is mounted on a heat sink member 20 and the array 18, diodes i-p, is mounted on a heat sink 22.

Referring to FIG. 2, array 16 is shown in more detail. Eight diodes a-h are shown, five of which a-e are mounted centered on line 16a. Three of the diodes f-h are mounted with centers thereof on line 16b. Lines 16a and 16b are slanted relative to horizontal preferably at an angle of 43° (plus or minus 3°). The spacing between the diodes along line 16a preferably is 0.35 inches maximum. The spacing between lines 16a and 16b in a preferred embodiment is similarly 0.35 inches maximum.

FIG. 3 is a sectional view taken along the line 3—3 of FIG. 1 and shows the diodes that are positioned on line 16a as mounted in a heat sink 20. It is found that this pattern produces an unusual effect. More particularly it has the output pattern of a single diode.

An array comprising two groups of IR gallium-aluminium-arsenide diodes is attached to a landing light ring providing IR energy to a wearer of goggles when conditions are such that the goggles become unusable due to low ambient light conditions. The diode groups form an array composed of a minimum of eight diodes per group and two groups per array. The diodes preferably are of the type manufactured and sold by TRW Optron, Type 232. Preferably they are powered at a steady state current limit of about 100 milliamps per diode. The spacing of the diodes within each of groups 16 and 18 are such that at least 75% of the diodes are within 0.35 inches (center to center) of at least two neighboring diodes. This provides the coupling required to avoid holes in the light pattern and to improve the output.

When such diodes are so mounted, the light from a group converges to provide a beam diameter of approximately 10° with a halo of at approximately 30° at ranges beyond fifteen meters. The attachment of the diodes as heat sink mounted to the landing light bezel may be an isolation mounting via a glass or polyamide attachment if total isolation is desired. The embodiment illustrated herein is specially designed for use on a helicopter which employs a landing light back-shell containing the diode array.

The TRW Optron 232 diode energy output is at 0.8 micron ±50 nm. This is near the peak response curve of goggles specially designated as an Aviator's Night Vision Imaging System manufactured and sold by Bell and Howell, 7100 McCormick Road, Chicago, Ill. 60645.

It will now be appreciated that the output of infrared radiation in ranges usable to current IR missile seekers has been eliminated. Further, the problem of heat buildup has been reduced if not eliminated by the low power requirements of the emitters.

Emitters above identified have a life expectancy in the excess of ten thousand hours. In a helicopter environment a life of one thousand hours should well be within range. The IR source as disclosed above is adequate for short range illumination of around 300 meters for nap of the earth operations of a helicopter.

The array may be operated at a lower power level by using pulsed excitation since the eye of the observer utilizing the goggles is characterized by having a period of retention.

Further, it will be recognized that if the array is pulse modulated it may be utilized for communication purposes.

Having described the invention in connection with certain specific embodiments thereof, it is to be understood that further modifications may now suggest themselves to those skilled in the art and it is intended to cover such modifications as fall within the scope of the appended claims.

We claim:

1. An IR source of illumination for use with night vision goggles comprising:

an array of a minimum of about eight Ga-Al-As diodes in planar distribution with the spacing of the diodes within said group such that a minimum of about 75% of the diodes provide coupling in the light pattern to at least two other diodes in the array to enhance the output thereof; and means to operate said diodes in parallel at about the current limit of the diodes.

2. An IR source of illumination for use with night vision goggles comprising:

an array of a minimum of about eight Ga-Al-As diodes in a planar distribution with the spacing of the diodes within said group such that each diode is within 0.35 inches center to center of at least two neighboring diodes for a minimum of 75% of the diodes to provide coupling in the light pattern to at least two other diodes in the array and to enhance the output thereof; and means to operate said diodes in parallel at about the current limit of the diodes whereby beams are generated which converge to provide a beam diameter of approximately 10° with a halo at approximately 30° at ranges beyond 15 meters.

3. An IR source of illumination for use with night vision goggles comprising:

an array of a minimum of about eight Ga-Al-As diodes per group with two groups per array in a planar distribution with the spacing of the diodes within each group such that each diode is within 0.35 inches center to center of at least two neighboring diodes for a minimum of 75% of the diode group to provide coupling in the light pattern and to enhance the output thereof; and means to operate said diodes in parallel at about the current limit of the diodes whereby beams are generated which converge to provide a beam diameter of approximately 10° with a halo at approximately 30° at ranges beyond 15 meters.

* * * * *

UNITED STATES PATENT AND TRADEMARK OFFICE
CERTIFICATE OF CORRECTION

PATENT NO. : 4,547,701

DATED : October 15, 1985

INVENTOR(S) : Robert R. Taylor, Billy C. Bowen, John H. Emery

It is certified that error appears in the above-identified patent and that said Letters Patent is hereby corrected as shown below:

Column 3, line 15, delete "at" (first occurrence).

Signed and Sealed this

Twenty-eighth Day of January 1986

[SEAL]

Attest:

DONALD J. QUIGG

Attesting Officer

Commissioner of Patents and Trademarks